United States Patent
Hsu

(10) Patent No.: US 8,447,149 B2
(45) Date of Patent: May 21, 2013

(54) OPTOELECTRONIC TRANSMISSION DEVICE

(75) Inventor: Chia-Ling Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 192 days.

(21) Appl. No.: 13/069,397

(22) Filed: Mar. 23, 2011

(65) Prior Publication Data
US 2012/0189248 A1     Jul. 26, 2012

(30) Foreign Application Priority Data
Jan. 26, 2011 (TW) .................................. 100102777

(51) Int. Cl.
*G02B 6/32* (2006.01)

(52) U.S. Cl.
USPC .................................. 385/33; 385/92; 385/93

(58) Field of Classification Search
USPC ........ 385/31, 33, 74, 92, 93, 94, 79; 398/135, 398/138, 139
See application file for complete search history.

(56) References Cited

U.S. PATENT DOCUMENTS

| | | | | |
|---|---|---|---|---|
| 4,865,410 A * | 9/1989 | Estrada et al. | .................. | 385/92 |
| 5,901,262 A * | 5/1999 | Kobayashi et al. | ............. | 385/89 |
| 6,821,027 B2 * | 11/2004 | Lee et al. | ......................... | 385/89 |
| 6,856,728 B2 * | 2/2005 | Zhang | ................................ | 385/33 |
| 6,888,988 B2 * | 5/2005 | Vancoille et al. | ............... | 385/47 |
| 7,630,609 B1 * | 12/2009 | Mays et al. | .................. | 385/137 |
| 7,850,373 B2 * | 12/2010 | Ishigami et al. | ................ | 385/92 |
| 2008/0044141 A1 * | 2/2008 | Willis et al. | ...................... | 385/88 |
| 2008/0232737 A1 * | 9/2008 | Ishigami et al. | ................ | 385/14 |
| 2012/0189248 A1 * | 7/2012 | Hsu | ................................. | 385/33 |

* cited by examiner

*Primary Examiner* — Brian Healy
(74) *Attorney, Agent, or Firm* — Altis Law Group, Inc.

(57) ABSTRACT

An optoelectronic transmission device includes a base, an optical signal source positioned on the base, a light detector positioned on the base, a carrier covering the optical signal source and the light detector, a first lensed optical fiber and a second lensed optical fiber. The carrier has a first through hole, a second through hole and a reflective surface. The first lensed optical fiber is received in the first through hole. The first lensed optical fiber has a first lens opposing the reflective surface for directing first light reflected by the reflective surface into the first lensed optical fiber. The second lensed optical fiber is received in the second through hole. The second lensed optical fiber has a second lens opposing the reflective surface for directing a second light transmitted by the second lensed optical fiber to the reflective surface.

11 Claims, 6 Drawing Sheets

OPTOELECTRONIC TRANSMISSION DEVICE

BACKGROUND

1. Technical Field

The present disclosure relates to optoelectronic transmission devices.

2. Description of Related Art

An optoelectronic transmission device typically includes an optical signal source, a light detector, a first optical fiber for sending output optical signals emitted from the optical signal source and a second optical fiber for receiving and directing input optical signals to the light detector. The light detector converts the input optical signals into electrical signals.

Additionally, a first lens is typically positioned between the optical signal source and the first optical fiber for directing light into the first optical fiber from the optical signal source, and a second lens is typically positioned between the light detector and the second optical fiber for directing light into the light detector from the second optical fiber. The lens has to be precisely aligned with the corresponding optical fiber to ensure optical transmittance. However, such alignment is generally difficult to achieve, which may result in poor optical transmittance.

Therefore, an optoelectronic transmission device, which can overcome the above-mentioned problems, is needed.

DETAILED DESCRIPTION

Figure 1:
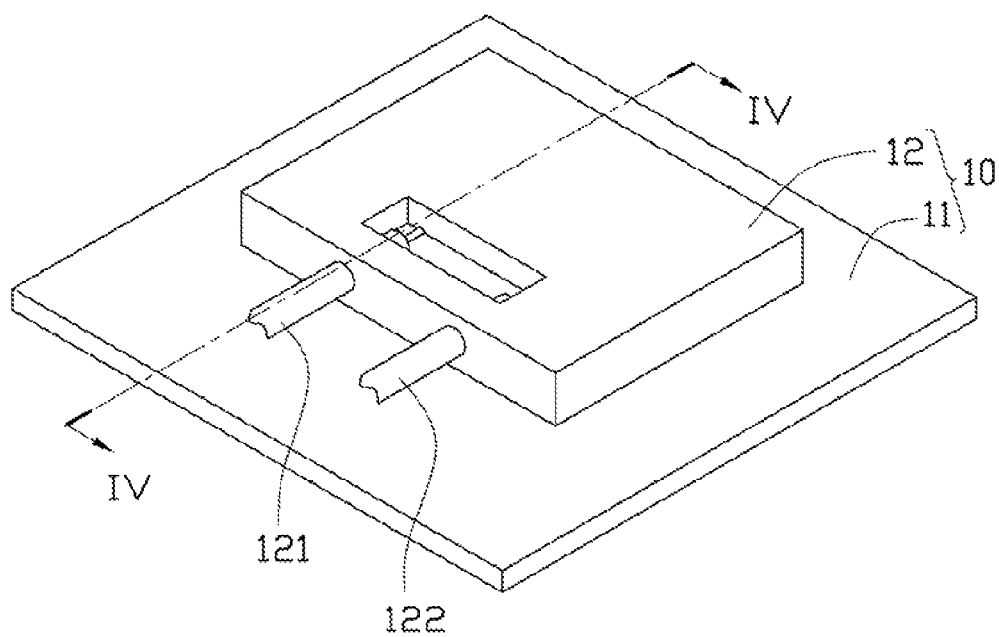
FIG. 1 is a schematic view of an optoelectronic transmission device including a carrier, according to a first embodiment.
Figure 2:
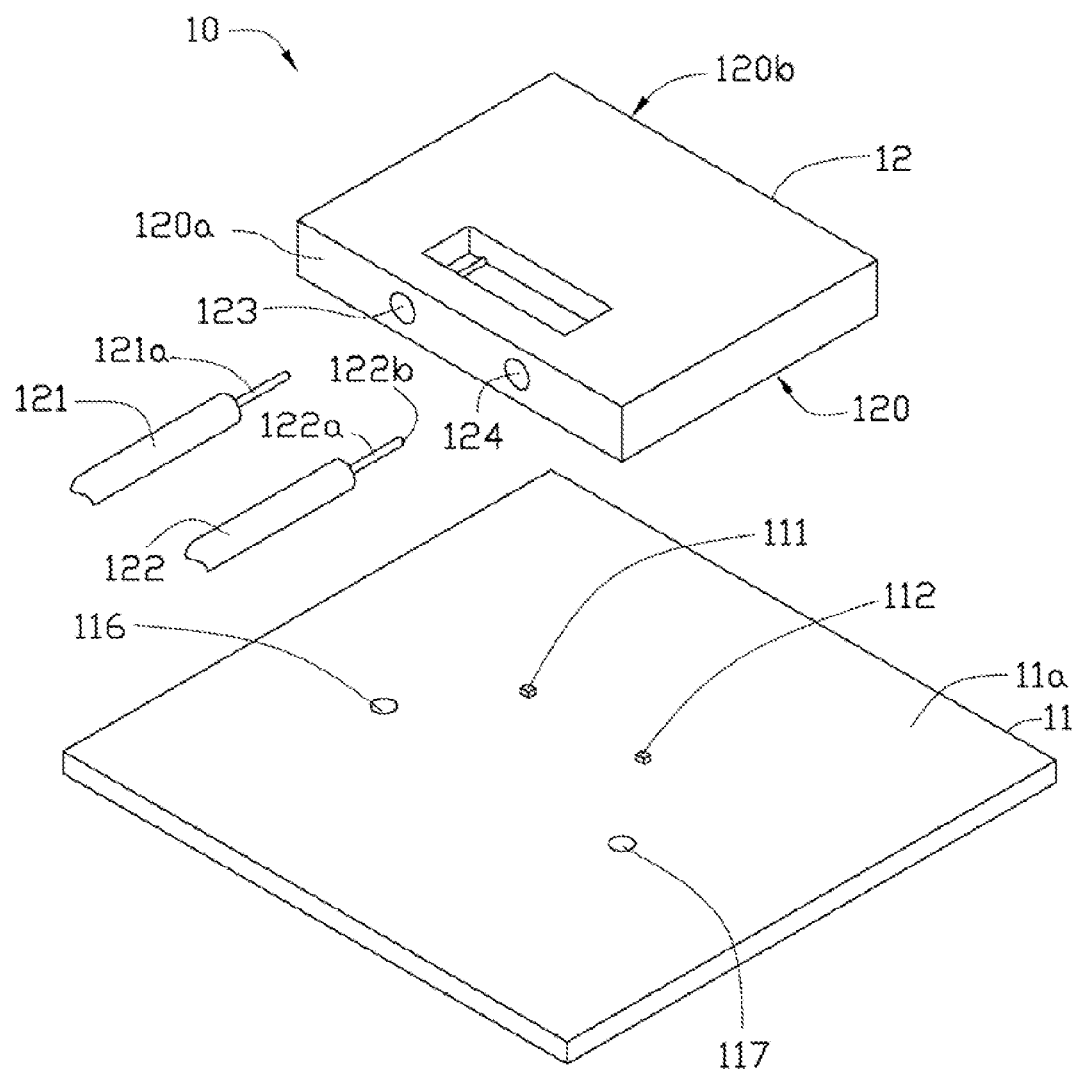
FIG. 2 is an explode view of the optoelectronic transmission device of FIG. 1.

Referring to FIGS. 1 to 5, an optoelectronic transmission device 10, according to a first embodiment, includes a base 11, a carrier 12, an optical signal source 111, a light detector 112, and two lensed optical fibers 121, 122 (hereinafter a first lensed optical fiber 121 and a second lensed optical fiber 122).

The base 11 may be a printed circuit board. The optical signal source 111 and the light detector 112 are positioned on the base 11 and electrically connected to the base 11. The optical signal source 111 may be a laser diode and the light detector 112 may be a photodiode. A first positioning hole 116 and a second positioning hole 117 are defined in a surface 11a of the base 11 where the optical signal source 111 and the light detector 112 are positioned.

The carrier 12 is substantially a cuboid. The carrier 12 includes a bottom surface 120, a first side surface 120a and a second side surface 120b. The first side surface 120a and the second side surface 120b are substantially parallel to each other and are substantially perpendicular to the bottom surface 120. The bottom surface 120 connects the first side surface 120a and the second side surface 120b. The bottom surface 120 is in contact with the surface 11a of the base 11.

Figure 3:
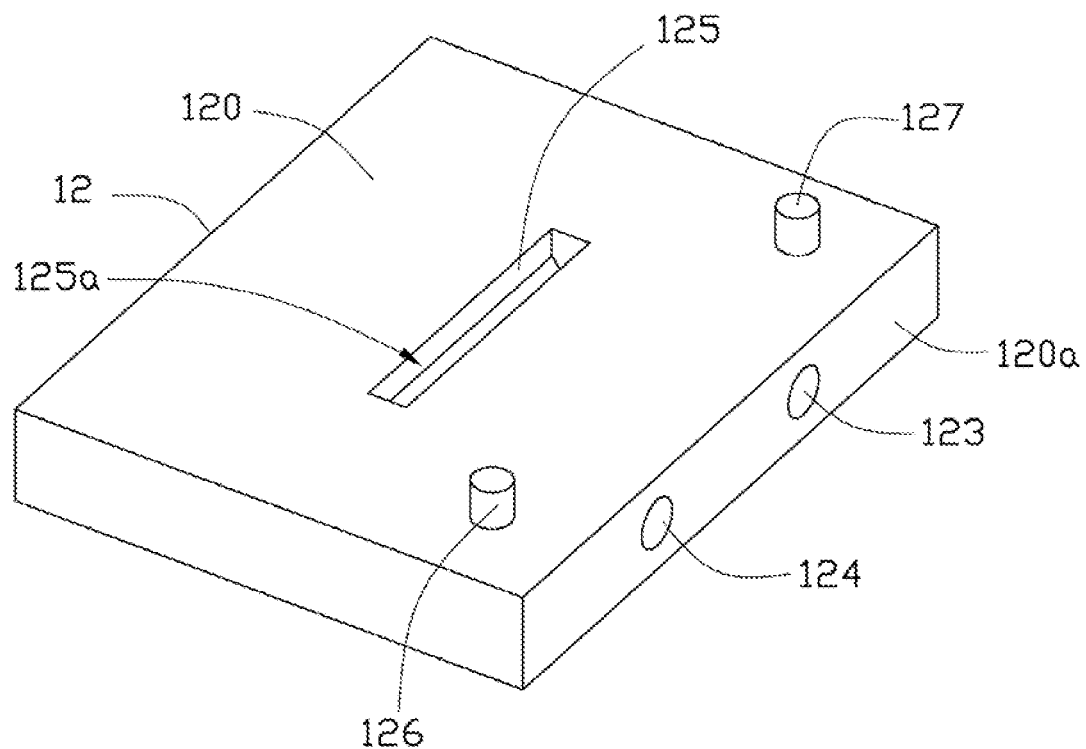
FIG. 3 is a schematic view of the carrier of FIG. 2, but viewed from another angle.
Figure 4:
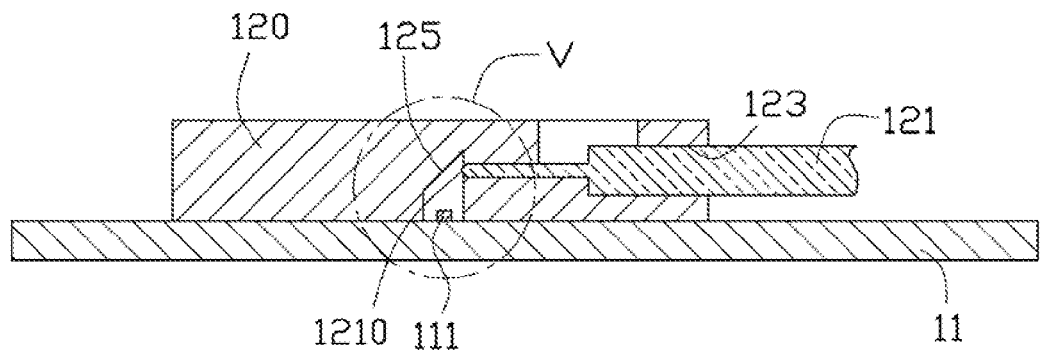
FIG. 4 is a sectional view taken along line IV-IV of the optoelectronic transmission device of FIG. 1.
Figure 5:
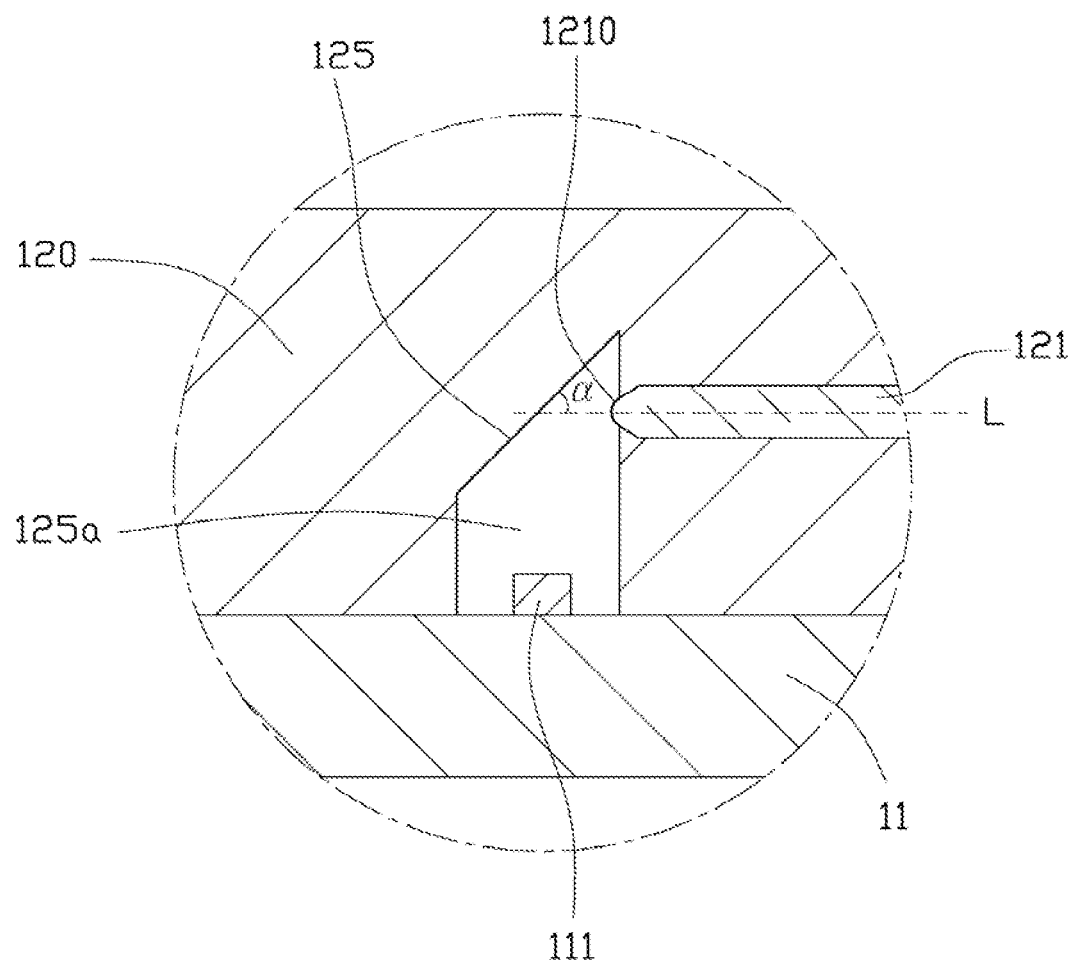
FIG. 5 is an enlarged view of the encircled part V of the optoelectronic transmission device of FIG. 4.

An elongated recess 125a is defined in the bottom surface 120 and a reflective surface 125 is formed in the recess 125a (see FIG. 3). The optical signal source 111 and the light detector 112 are arranged along a longitudinal direction of the recess 125a.

A first through hole 123 and a second through hole 124 are defined in the first side surface 120a and extend from the first side surface 120a and the second side surface 120b. The first through hole 123 is substantially parallel to the second through hole 124. The first through hole 123 and the second through hole 124 are in communication with the recess 125a. An included angle $\alpha$ between a central axis L of the first through hole 123 and the reflective surface 125 is about 45 degrees.

A first positioning post 126 and a second positioning post 127 extend from the bottom surface 120. The first positioning post 126 is securely received in the first positioning hole 116. The second positioning post 127 is securely received in the second positioning hole 117. Thus, the carrier 12 can be secured on the base 11 in place. The optical signal source 111 and the light detector 112 are received in the recess 125a and face the reflective surface 125.

The first lensed optical fiber 121 is received in the first through hole 123 and includes a first core 121a. A distal end of the first core 121a forms a first lens 1210. The first lens 1210 is exposed in the recess 125a. The first lens 1210 can be formed by machining the distal end of the first core 121a using ultra-precision machining technology. In this embodiment, the first lens 1210 is a convex lens. The shape of the first lens 1210 can be selected from the group consisting of a hemispherical lens, a conical lens, a Fresnel lens, a microsphere lens and a taped hemispherical lens. The light emitted from the optical signal source 111 propagates towards the reflective surface 125. The reflective surface 125 reflects the light towards the first lens 1210. Therefore, light from the optical signal source 111 can be transmitted inside the first core 121a and precise alignment between the first lens 1210 and the first core 121a can be achieved. The reflective surface 125 is oriented at about 45 degrees relative to the first and second lensed optical fibers 121, 122.

The second lensed optical fiber 122 is received in the second through hole 124. Configurations of the second lensed optical fiber 122 are substantially the same as those of the first lensed optical fiber 121. Light transmitted along a second core 122a of the second lensed optical fiber 122 is output from a second lens 122b of the core 122a, and then impacts on the reflective surface 125. The reflective surface 125 reflects the light from the second lensed optical fiber 122 towards the light detector 112. Therefore, optical signals from the second lensed optical fiber 122 can be received and be converted into electrical signals by the light detector 112 and precise alignment between the second lens 122b and the second core 122a can be achieved.

It is to be understood that in alternative embodiments, the base 11 may include positioning posts and the carrier 12 may define positioning holes. The number of the lensed optical fibers and through holes may not be limited to two and can be adjusted depending on practical use. The number of the optical signal source and light detector may not be limited to one and can be adjusted depending on practical use. The value of the included angle $\alpha$ between the central axis L of the first through hole 123 and the reflective surface 125 can be adjusted as long as the reflective surface 125 can reflect light emitted from the optical signal source 111 into the first lensed optical fiber 121, and the light detector 112 can receive the optical signals from the second lensed optical fiber 122 reflected by the reflective surface 125.

Figure 6:
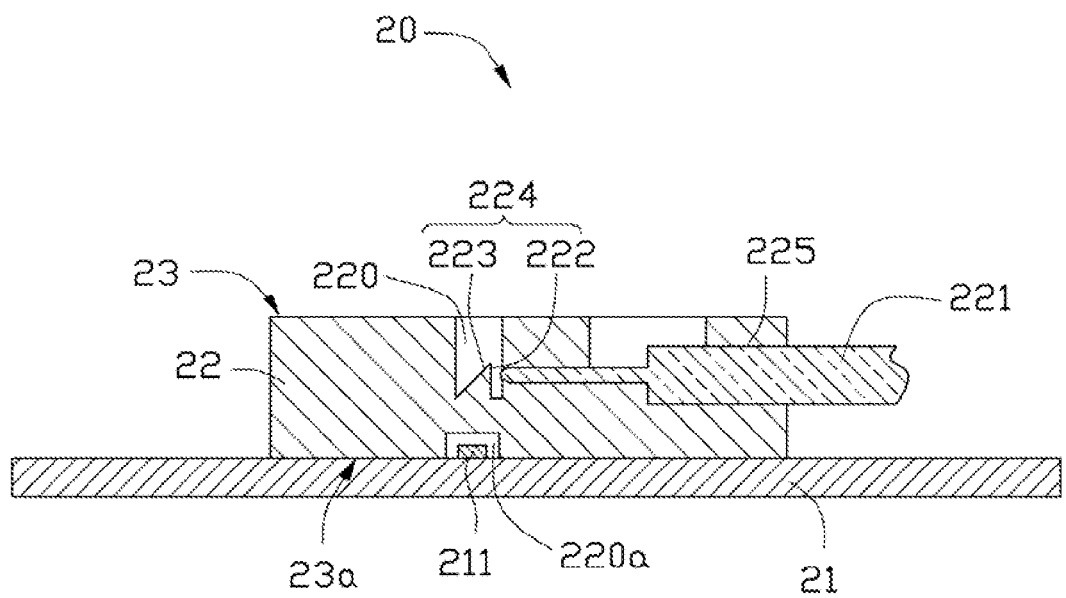
FIG. 6 is a sectional view of an optoelectronic transmission device, according to a second embodiment.

Referring to FIG. 6, an optoelectronic transmission device 20, according to a second embodiment, is shown. The difference between the optoelectronic transmission device 20 and the optoelectronic transmission device 10 of the first embodiment is that a carrier 22 of the optoelectronic transmission device 20 differs.

A bottom surface 23a of the carrier 22 defines a bottom recess 220a. The bottom recess 220a is substantially a cuboid. An optical signal source 211 and a light detector (not shown) are received in the bottom recess 220a.

A top surface 23 of the carrier 22 defines a top recess 220. The top recess 220 corresponds to the bottom recess 220a. The top recess 220 is in communication with a through hole 225 of the carrier 22. A lensed optical fiber 221 is received in the through hole 225.

A reflective strip 224 extends from a bottom of the top recess 220 along a direction substantially perpendicular to a central axis of the lensed optical fiber 221. The strip 224 is spaced from a distal end of the lensed optical fiber 221, i.e., an air gap is formed between the strip 224 and the distal end of the lensed optical fiber 221. The strip 224 includes a vertical surface 222 and a reflective surface 223. The vertical surface 222 is substantially perpendicular to the top surface 23 and the central axis of the lensed optical fiber 221. The reflective surface 223 is connected to the vertical surface 222. An included angle between the reflective surface 223 and the vertical surface 222 is about 45 degrees. Light emitted from the optical signal source 211 propagates inside the carrier 22 and towards the reflective surface 223. The reflective surface 223 reflects the light towards a lens (not labeled) of the lensed optical fiber 221. Therefore, light from the optical signal source 211 can be transmitted inside the lensed optical fiber 221.

Advantages of the optoelectronic transmission device 20 are similar to those of the optoelectronic transmission device 10 of the first embodiment.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optoelectronic transmission device, comprising:
   a base;
   a first lensed optical fiber configured for transmitting first light;
   a second lensed optical fiber configured for transmitting second light;
   an optical signal source positioned on the base and configured for emitting the first light;
   a light detector positioned on the base and configured for receiving and converting the second light into electrical signals; and
   a carrier positioned on the base, the carrier covering the optical signal source and the light detector, the carrier having a first through hole, a second through hole and a reflective surface configured for reflecting the first light from the optical signal source to the first lensed optical fiber and reflecting the second light from the second lensed optical fiber to the light detector; the first lensed optical fiber received in the first through hole, the first lensed optical fiber having a first lens at a distal end thereof opposing the reflective surface for directing the first light reflected by the reflective surface to the first lensed optical fiber; the second lensed optical fiber received in the second through hole, the second lensed optical fiber having a second lens at a distal end thereof opposing the reflective surface for directing the second light transmitted by the second lensed optical fiber to the reflective surface.

2. The optoelectronic transmission device of claim 1, wherein the reflective surface is oriented at about 45 degrees relative to the first and second lensed optical fibers.

3. The optoelectronic transmission device of claim 1, wherein an elongated recess is defined in a bottom surface of the carrier and the reflective surface is formed in the recess, and the optical signal source and the light detector are arranged along a longitudinal direction of the recess on the base, the elongated recess is in communication with the first through hole and the second through hole.

4. The optoelectronic transmission device of claim 1, wherein the base comprises a first positioning means at a surface thereof in contact with the carrier, and the carrier comprises a second positioning means at a bottom surface thereof, the first positioning means engages with the second positioning means to secure the base and the carrier together.

5. The optoelectronic transmission device of claim 4, wherein the first positioning means comprises a plurality of positioning holes and the second positioning means comprises a plurality of positioning posts, each positioning post is securely received in a corresponding positioning hole.

6. The optoelectronic transmission device of claim 4, wherein the first positioning means comprises a plurality of positioning posts and the second positioning means comprises a plurality of positioning holes, each positioning post is securely received in a corresponding positioning hole.

7. The optoelectronic transmission device of claim 1, wherein a bottom recess is defined in a bottom surface of the carrier and a top recess is defined in a top surface of the carrier, and the optical signal source and the light detector are arranged along a longitudinal direction of the bottom recess on the base, the top recess is in communication with the first through hole and the second through hole.

8. The optoelectronic transmission device of claim 7, wherein the carrier comprises a reflective strip extending from a bottom of the top recess, the reflective strip opposes the first lens and the second lens, the reflective strip comprises a vertical surface and the reflective surface connected to the vertical surface, the vertical surface is substantially perpendicular to the first lensed optical fiber and the second lensed optical fiber.

9. The optoelectronic transmission device of claim 8, wherein the reflective strip is spaced from the distal ends of the first and second lensed optical fibers.

10. The optoelectronic transmission device of claim 8, wherein an included angle between the vertical surface and the reflective surface is about 45 degrees.

11. The optoelectronic transmission device of claim 1, wherein the first lensed optical fiber comprises a first core, a distal end of the first core forms the first lens, the second lensed optical fiber comprises a second core, and a distal end of the second core forms the second lens.

* * * * *